(12) United States Patent
Wolf et al.

(10) Patent No.: US 11,745,627 B2
(45) Date of Patent: Sep. 5, 2023

(54) DOUBLE FITTING FOR A VEHICLE SEAT, AND VEHICLE SEAT

(71) Applicant: Keiper Seating Mechanisms Co., Ltd., Shanghai (CN)

(72) Inventors: Christian Wolf, Dielkirchen (DE); Viktor Enns, Kaiserslautern (DE); Thomas Dill, Heiligenmoschel (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 4 days.

(21) Appl. No.: 17/594,960

(22) PCT Filed: May 4, 2020

(86) PCT No.: PCT/EP2020/062256
§ 371 (c)(1),
(2) Date: Nov. 4, 2021

(87) PCT Pub. No.: WO2020/225183
PCT Pub. Date: Nov. 12, 2020

(65) Prior Publication Data
US 2022/0281363 A1  Sep. 8, 2022

(30) Foreign Application Priority Data
May 6, 2019 (DE) .................... 10 2019 111 595.7

(51) Int. Cl.
*B60N 2/225* (2006.01)
(52) U.S. Cl.
CPC ......... *B60N 2/2252* (2013.01); *B60N 2/2254* (2013.01)
(58) Field of Classification Search
CPC ... B60N 2/682; B60N 2205/35; B60N 2/2254
See application file for complete search history.

(56) References Cited

U.S. PATENT DOCUMENTS

| | | | |
|---|---|---|---|
| 8,020,932 B2 * | 9/2011 | Yamada | B60N 2/20 297/248 |
| 2007/0138853 A1 * | 6/2007 | Ito | B60N 2/2254 297/362 |

(Continued)

FOREIGN PATENT DOCUMENTS

| | | |
|---|---|---|
| DE | 3529887 A1 | 3/1987 |
| DE | 102006000532 A1 | 6/2007 |

(Continued)

OTHER PUBLICATIONS

European Patent Office, International Search Report and Written Opinion in Application No. PCT/EP2020/062256, dated Aug. 19, 2020, 11 pages, Rijswijk, Netherlands.

*Primary Examiner* — Timothy J Brindley
(74) *Attorney, Agent, or Firm* — Marshall & Melhorn, LLC (57) ABSTRACT

A double fitting for a vehicle seat may have a first fitting part and a second fitting part that are drivingly connected to each other. The double fitting may also have adapter parts that can be connected to at least one of the fitting parts. One of the adapter parts can be connected to a structural part of the vehicle seat or to a vehicle body part, and the other adapter part is movably connected to a limited degree to the other adapter part which can be rigidly connected to the structural part or the vehicle body part. An elastic element is arranged between the adapter parts, a first fitting of the fittings is arranged axially between the adapter parts, and one of the adapter parts is arranged axially between the fitting. A vehicle seat having the double fitting is also disclosed.

15 Claims, 5 Drawing Sheets

(56) References Cited

U.S. PATENT DOCUMENTS

| | | | | |
|---|---|---|---|---|
| 2010/0060064 A1* | 3/2010 | Kienke | ................... | B60N 2/20 |
| | | | | 297/361.1 |
| 2010/0187878 A1* | 7/2010 | Funk | ....................... | B60N 2/22 |
| | | | | 297/354.1 |
| 2016/0339810 A1* | 11/2016 | Pluta | ....................... | B60N 2/01 |
| 2017/0015220 A1* | 1/2017 | Albert Reginold | .. | B60N 2/2254 |

FOREIGN PATENT DOCUMENTS

| | | | |
|---|---|---|---|
| DE | 102006051270 B3 * | 5/2008 | ........... B60N 2/3013 |
| DE | 102011012076 A1 | 8/2012 | |
| DE | 102004049114 B4 | 12/2013 | |
| WO | 2015104260 A1 | 7/2015 | |
| WO | 2015132215 A1 | 9/2015 | |

* cited by examiner

DOUBLE FITTING FOR A VEHICLE SEAT, AND VEHICLE SEAT

FIELD

The invention relates to a double fitting for a vehicle seat, in particular for a motor vehicle seat, the double fitting having two fittings which are operatively connected to one another, wherein each of the two fittings comprises a first fitting part and a second fitting part, wherein the first fitting part and the second fitting part of each of the two fittings are in each case in geared connection with one another or are lockable together and are rotatable relative to one another about an axis, and two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat or is fixedly connectable to a vehicle body part, and the other of the two adapter parts is connected, so as to be movable to a limited extent, in particular rotatable about the axis to a limited extent, to the adapter part which is fixedly connectable to the structure part of the vehicle seat or to the adapter part which is fixedly connectable to the vehicle body part, wherein at least one elastic element is arranged between the adapter parts. The invention furthermore relates to a vehicle seat having a double fitting of said type.

BACKGROUND

In the case of vehicle seats with belt integration, that is to say vehicle seats in the case of which some or all fastening points of a safety belt system are connected to the vehicle seat, the fact that a safety belt or a belt retractor mechanism of the safety belt is connected to the backrest upper edge of a backrest of the vehicle seat has the effect that, in the event of a crash, considerably higher loads act in a fitting, which serves as a backrest adjuster, than in the case of vehicle seats without belt integration. The required high outlay for development for fittings designed specifically for such high loads is, from an economic aspect, often opposed to the normally low production numbers of such belt-integral seats. Since the strength requirements for fittings in belt-integral seats are often in the range of twice the strength of fittings for conventional seats without belt connection to the backrest, it is normally the case that, for belt-integral seats, two identical fittings are connected in parallel to form a double fitting and are fixedly connected to one another in order to thereby provide, in an economical manner, a fitting for a belt-integral seat. DE 35 29 887 A1 has disclosed a double fitting of said type.

In the case of two single fittings being connected in parallel and rigidly connected to one another to form a double fitting, the loads in the event of a crash are distributed between the two interconnected fittings, such that the strength requirements are met. It is however sought for the mechanisms in the two fittings, despite the rigid connection to one another, to also satisfy functional requirements with regard to an elimination of play during driving operation and with regard to maximum admissible actuation moments during adjustment, such as is conventional in the case of single fittings.

In the case of continuous backrest adjusters being used, that is to say classic tumble mechanism fittings with wedge eccentrics for elimination of play, which are also referred to as geared fittings and which are known for example from DE 10 2011 012 076 A1, it is known for component tolerances to be compensated by way of a wedge eccentric system comprising two oppositely spring-preloaded wedge segments. Here, the effective axis spacing of the two gearing parts relative to one another automatically adjusts, by way of the wedge movement, to the extent required for the elimination of play. During the course of the expected overall fluctuation of component tolerances of the individual parts of a single fitting, it is possible with this technology to economically produce play-free and nevertheless easily adjustable single fittings. In the case of an absolutely rigid connection of two single fittings to one another, that is to say a rigid connection of two first fitting parts to one another and of two second fitting parts to one another, in the case of which an identical axis spacing dimension is fixed to an identical dimension for both fittings, the effectively required axis spacings of the two interconnected fittings can no longer be adjusted independently of one another. As a result, it is necessary for further, relatively high demands to be placed on the tolerance compensation capability of the wedge eccentric systems, or the admissible tolerance range of the individual parts must be restricted to a greater extent than is necessary for single fittings. Both possibilities entail additional outlay in the production process, be it in the production of the individual parts, in the need for other individual parts to be assembled together or in the joining process during which the single fittings must be connected to one another in a precise alignment relative to one another.

DE 10 2006 000 532 A1 has disclosed a double fitting having two interconnected fittings, wherein each of the two fittings has a first fitting part and a second fitting part which are in toothed engagement with one another. One of the two fittings has a wedge eccentric, which is arranged between the first fitting part and the second fitting part, for the elimination of play in the toothed engagement. The other of the two fittings has, instead of a wedge eccentric, a support element which is arranged between the first fitting part and the second fitting part and which has a smaller eccentricity than the wedge eccentric of the other fitting. During the normal operation of the double fitting, only the wedge eccentric but not the support element bears load. After a limited deformation in the double fitting, such as arises in particular in the event of a vehicle collision, the support element additionally supports the toothed engagement.

DE 10 2004 049 114 B4 discloses a double fitting which comprises a first fitting part, a second fitting part and an eccentric which are each arranged on a common axis of rotation. The first fitting part is formed from two first fitting part elements. The second fitting part is formed from two second fitting part elements.

WO 2015/132215 A1 has disclosed a double fitting for a vehicle seat, having two fittings which are operatively connected to one another, wherein each of the two fittings has a first fitting part and a second fitting part which are rotatable relative to one another about an axis, wherein the first fitting part and the second fitting part are in geared connection with one another or are lockable together, and two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts. It is provided according to the invention that exactly one of the adapter parts is fixedly connectable to a structure part of the vehicle seat and the other of the two adapter parts is rotatable about the axis to a limited extent relative to the structure part and relative to the adapter part which is fixedly connectable to the structure part.

WO 2015/104260 A1 has disclosed a vehicle seat, having a seat segment which comprises a first seating position with a first backrest, a second seating position with a second backrest, and a seat part, wherein the first backrest and the second backrest are connected to the seat part and are pivotable relative to the seat part about a pivot axis, and wherein a first fitting is provided, the first fitting part of which is connected rotationally conjointly to the seat part and the second fitting part of which is connected rotationally conjointly to the first backrest, and a second fitting is provided, the first fitting part of which is connected rotationally conjointly to the first backrest and the second fitting part of which is connected rotationally conjointly to the second backrest.

SUMMARY

The invention is based on the problem of improving a double fitting of the type mentioned in the introduction, in particular of connecting two fittings, such as are known per se, to one another such that the correct functioning thereof during normal use is realized without additional outlay and, nevertheless, in the event of a crash, both fittings jointly accommodate the high load. It is sought to avoid a generation of noise as a result of contact between components, in particular contact between adapter parts. Furthermore, it is sought to provide a vehicle seat having a double fitting of said type, which double fitting satisfies high demands with regard to strength and functionality.

Said object is achieved by means of a double fitting for a vehicle seat, in particular for a motor vehicle seat, the double fitting having two fittings which are operatively connected to one another, wherein each of the two fittings comprises a first fitting part and a second fitting part, wherein the first fitting part and the second fitting part of each of the two fittings are in each case in geared connection with one another or are lockable together and are rotatable relative to one another about an axis, and two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat or is fixedly connectable to a vehicle body part, and the other of the two adapter parts is connected, so as to be movable to a limited extent, in particular rotatable about the axis to a limited extent, to the adapter part which is fixedly connectable to the structure part of the vehicle seat or to the adapter part which is fixedly connectable to the vehicle body part, wherein at least one elastic element is arranged between the adapter parts.

A first of the two fittings of the double fitting is arranged axially between the two adapter parts. One of the two adapter parts is arranged axially between the two fittings of the double fitting. Preferably, the second adapter part is arranged axially between the two fittings of the double fitting. This yields an alternative arrangement of the adapter parts and fittings with respect to one another in relation to double fittings known from the prior art, which adapter parts and fittings can in particular be better concealed using a plastics trim panel.

The two fittings are operatively connected to one another such that the adjustment (change in angle) of one of the two fittings imperatively also causes a substantially analogous adjustment (change in angle) of the other fitting. For this purpose, the two fittings are for example operatively connected to one another by means of a transmission rod. In order to compensate play and/or tolerances of the two fittings, one adapter part is connected, so as to be movable to a limited extent, to the other adapter part. Here, the two adapter parts are movable to a limited extent with respect to one another only to the extent required for the compensation of play and/or tolerances in the fittings. Beyond this, the adapter parts are, with the interposition of the elastic element, connected to one another rotationally conjointly about the axis. The limited relative rotation between the adapter parts about the axis causes an elastic deformation of the elastic element, if appropriate after an idle travel has been passed through. The elastic element dampens an abutment of the adapter parts against one another and thus prevents undesired generation of noise.

The elastic element may have a material with a flexibility greater than the flexibility of the material of the first adapter part. The elastic element may have a material with a flexibility greater than the flexibility of the material of the first adapter part in a region of the first adapter part against which the at least one elastic element bears. The elastic element may have a material with a flexibility greater than the flexibility of the material of the second adapter part. The elastic element may have a material with a flexibility greater than the flexibility of the material of the second adapter part in a region of the second adapter part against which the at least one elastic element bears.

The at least one elastic element may have an elastic material. The at least one elastic element may have a plastic. The at least one elastic element may have a rubber material. The at least one elastic element may be manufactured from an elastic material. The at least one elastic element may be manufactured from a plastic. The at least one elastic element may be manufactured from a rubber material.

The at least one elastic element may be arranged in a radial direction between the adapter parts. The at least one elastic element may be arranged in an axial direction between the adapter parts.

The at least one elastic element may be a bearing bushing. The at least one elastic element may be a ring-shaped bearing bushing. The at least one elastic element may be a bearing bushing with an I-shaped cross section. The at least one elastic element may be a bearing bushing with an L-shaped cross section. The at least one elastic element may be a bearing bushing with a C-shaped cross section. The at least one elastic element may be a bearing bushing with a U-shaped cross section.

The second adapter part preferably has at least one bushing. The bushing may be pressed into the second adapter part. The bushing may be fastened in form-fitting fashion to the second adapter part. The bushing may be a threaded bushing. The bushing may be a collar in the second adapter part. The at least one elastic element may be arranged on the at least one bushing. The at least one elastic element may be pushed onto the at least one bushing. The at least one elastic element may support the first adapter part in a radial direction. The at least one elastic element may bear the first adapter part in a radial direction.

The first adapter part may be fastened to the first fitting part, and an adapter may be fastened to the second fitting part of the fitting arranged between the two adapter parts of the double fitting. The adapter preferably engages axially over the other fitting of the double fitting. The second adapter part may be fastened to the first fitting part of the other fitting.

Limited mobility between the adapter parts of the double fitting is achieved by virtue of the at least one elastic element being capable of being elastically deformed. Here, a play between the at least one elastic element and at least one of the two adapter parts can allow limited mobility without elastic deformation of the at least one elastic element. The elastic element then serves merely as an impact damper.

The double fitting preferably has two geared fittings. It may however also be advantageous for a double fitting constructed from two detent-type fittings to be designed according to the invention. The basic problem of the mutual influencing of functioning in the case of a non-exact position of the single fitting centers relative to one another exists in the case of detent-type fittings, too, and can—for example in the case of large angles being passed through for the free pivoting of the backrest—lead to undesired contact situations and increased pivoting forces.

The object is furthermore achieved by means of a vehicle seat having a backrest and having a seat part, wherein the backrest is, by means of a double fitting according to the invention, connected to a structure part of the seat part or connectable to a vehicle body part. The backrest may be articulated on the structure part of the seat part. The seat part may, by means of seat rails such as are known per se, be longitudinally displaceable, in particular relative to a vehicle body into which the vehicle seat is installable. The backrest may alternatively be articulated directly on one or more vehicle body parts. A force flow of forces introduced into the backrest is then introduced directly into the vehicle body via the double fitting, bypassing the seat part.

A further backrest of the vehicle seat may be connected by means of a further fitting to the structure part of the seat part. A further backrest of the vehicle seat may be connectable by means of a further fitting to the vehicle body part. One fitting part of the further fitting may be fixedly connected to one of the adapter parts, in particular to the first adapter part. One fitting part of the further fitting may be fixedly connected, with the interposition of a spacer disk, to one of the adapter parts, in particular to the first adapter part.

One of the two adapter parts, in particular the first adapter part, may be fixedly connected to the structure part of the seat part. The other of the two adapter parts, in particular the second adapter part, may be movable, in particular rotatable about the axis, to a limited extent relative to the structure part of the seat part. Alternatively, exactly one of the two adapter parts may be fixedly connected to the backrest, and the other of the two adapter parts may be movable, in particular rotatable about the axis, to a limited extent relative to the backrest.

In other words, the object is achieved inter alia in that two fittings of the double fitting according to the invention are fixedly connected to one another on one of two sides, in particular gearing sides, of the fittings, but on the other side have a free play with respect to one another which is at least partially dampened by an elastic element, which free play exists at all times during the normal operation of the vehicle seat. It is thus possible for the two fittings to perform their function in a manner decoupled from one another in regions relevant for essential functional characteristics, whereas, in a crash situation, after a definable deformation of the at least one elastic element and of the first fitting and/or of a structural part, said play is overcome, the second fitting comes into contact with the first fitting in the load direction, and both fittings then jointly accommodate the load.

DESCRIPTION OF THE FIGURES

Below, the invention will be discussed in more detail on the basis of an advantageous exemplary embodiment illustrated in the figures. The invention is however not restricted to said exemplary embodiment. In the figures.

DETAILED DESCRIPTION

Figure 1:
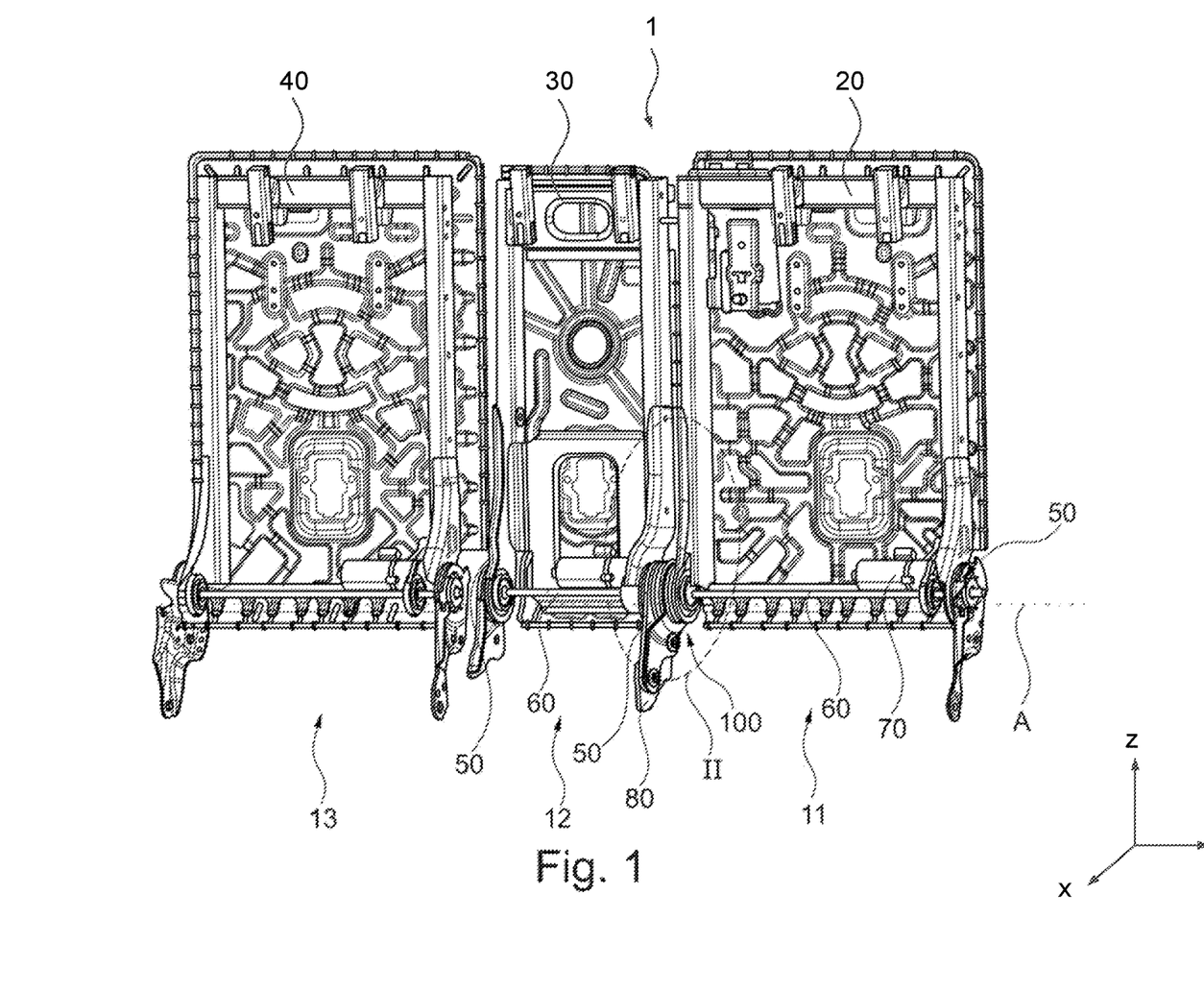
FIG. 1 shows a perspective view of backrests of a vehicle seat according to the invention.

FIG. 1 shows, in particular, three backrests 20, 30, 40 of a vehicle seat 1 according to the invention. The vehicle seat 1 is in the present case designed as a rear seat assembly of a motor vehicle. In a modification of the exemplary embodiment, a vehicle seat according to the invention is a front seat of a motor vehicle.

The vehicle seat 1 comprises a first seat segment, with a first seating position 11 and a second seating position 12, and a second seat segment, with a third seating position 13. The two seat segments may preferably be connectable, so as to be longitudinally adjustable independently of one another by means of longitudinal adjusters known from the prior art but not illustrated in FIG. 1, to a body structure of the motor vehicle.

The vehicle seat 1 will be described below using three mutually perpendicular spatial directions of a vehicle coordinate system. In the case of a vehicle seat 1 installed in the vehicle, a longitudinal direction x runs substantially horizontally and preferably parallel to a vehicle longitudinal direction, which corresponds to the normal direction of travel of the vehicle. A transverse direction y, which runs perpendicular to the longitudinal direction x, is likewise oriented horizontally in the vehicle and runs parallel to a vehicle transverse direction. A vertical direction z runs perpendicular to the longitudinal direction x and perpendicular to the transverse direction y. In the case of a vehicle seat 1 installed in the vehicle, the vertical direction z runs parallel to the vehicle vertical axis.

The position and directional statements used here, such as front, rear, top and bottom, relate to a viewing direction of an occupant seated on the vehicle seat 1 in a normal seating position, wherein the vehicle seat 1 is installed in the vehicle in a usage position suitable for conveying passengers, with substantially upright backrests 20, 30, 40, and is oriented in the conventional manner in the direction of travel. The vehicle seat 1 according to the invention may however also be installed in a different orientation, for example transversely with respect to the direction of travel.

In the present case, the first seat segment accounts for approximately 60% of the total width of the vehicle seat 1 in the transverse direction y, whereas the second seat segment accounts for approximately 40% of the width in the transverse direction y. The first seat segment provides seating space for two occupants (seating positions 11, 12). The second seat segment provides seating space for a third occupant (third seating position 13).

A first backrest 20 and a second backrest 30 are attached to a first seat part (not fully illustrated in the figures) of the vehicle seat 1 so as to be pivotable independently of one another about an axis A. The first seat part is preferably one continuous seat bench for the two occupants of the first seat segment.

A third backrest 40 is pivotably attached to a second seat part (not fully illustrated in the figures) of the vehicle seat 1. The second backrest 30 is arranged between the first backrest 20 and the third backrest 40 as viewed in the transverse direction y. The axis A runs horizontally, parallel to the transverse direction y.

The first backrest 20, together with a part of the first seat part, forms the first seating position 11. The second backrest 30, together with a part of the first seat part, forms the second seating position 12. The third backrest 40, together with the second seat part, forms the third seating position 13. The first seating position 11 and the second seating position 12 are assigned to the first seat segment, and the third seating position 13 is assigned to the second seat segment.

The first backrest 20 is, in a lateral region facing toward the second backrest 30, articulated on a structure part 80 of the first seat part by means of a double fitting 100 according to the invention. The first backrest 20 is, in a lateral region facing away from the second backrest 30, articulated on the first seat part by means of a fitting 50. The second backrest 30 is, in a lateral region facing toward the first backrest 20, articulated on the first seat part by means of a fitting 50. The second backrest 30 is, in a lateral region facing away from the first backrest 20, articulated on the first seat part by means of a further fitting 50.

Arranged in an upper corner region of the first backrest 20 is a belt retractor mechanism of a three-point belt system which can be used to secure an occupant in the second seating position 12. In a crash situation, belt forces are introduced into the first backrest 20 by means of the belt retractor mechanism. Said belt forces are for the most part absorbed by that lateral region of the first backrest 20 which faces toward the second backrest 30, and by the double fitting 100 arranged below the belt retractor mechanism, and transmitted into the structure part 80, whereas the fitting 50 arranged on the opposite side of the first backrest 20 is subjected to much lower loads, and can thus be configured as an individual standard component.

A double fitting 100 according to the invention, and the arrangement thereof in the first seat segment, will be described below on the basis of FIGS. 2 to 6.

The double fitting 100 comprises two fittings 50 arranged in parallel in the force flow, and can thus be subjected to higher force and torque loads in relation to a structurally identical single fitting 50 before a failure of components of the double fitting 100, in particular of one of the two fittings 50 of the double fitting 100, occurs. The two fittings 50 of the double fitting 100 are in the present case, like the other fittings 50 of the vehicle seat 1, designed in each case as a geared fitting, in particular tumble fitting, as is known for example from DE 10 2009 053 250 A1. The invention is however not restricted to geared fittings. The doubling of fittings according to the invention for high-load applications may in principle also be implemented with detent-type fittings, as are known for example from DE 10 2009 041 490 A1.

The double fitting 100 is composed of two identical fittings 50 such as are known per se, the construction of which corresponds to the other fittings 50 of the vehicle seat 1. Each of the two fittings 50 of the double fitting 100 comprises a first fitting part 111 and a second fitting part 112, which are rotatable relative to one another about an axis A and which, in the case of the fittings 100 being in the form of geared fittings, are in geared connection with one another or, in the case of the fittings 100 being in the form of detent-type fittings, are lockable together. The axis A defines the directional statements, used below, relating to a cylindrical coordinate system. The cylindrical coordinate system of the double fitting 100 is oriented in the vehicle coordinate system such that the axis A is oriented parallel to the transverse direction y.

Figure 2:
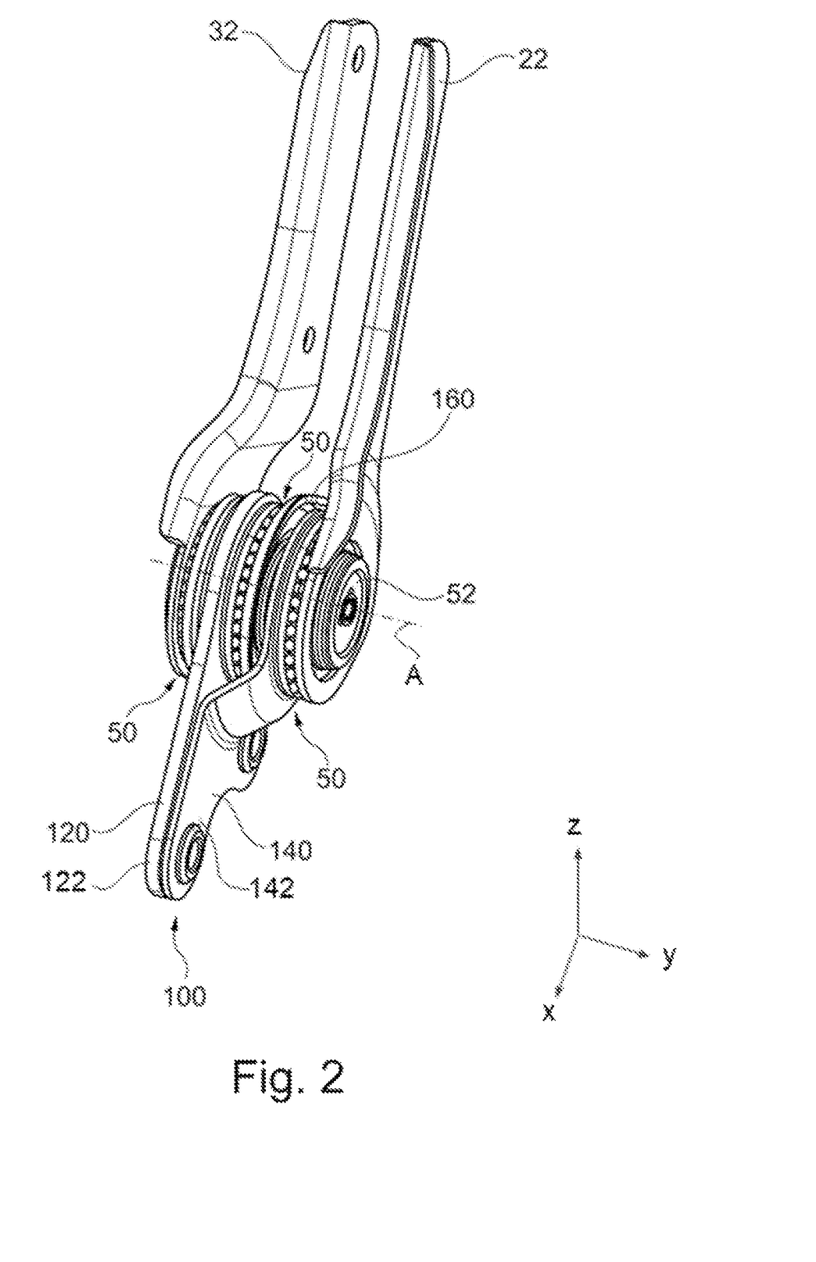
FIG. 2 shows a detail II from FIG. 1, specifically a perspective view of a double fitting according to the invention and further components of the vehicle seat according to the invention.
Figure 3:
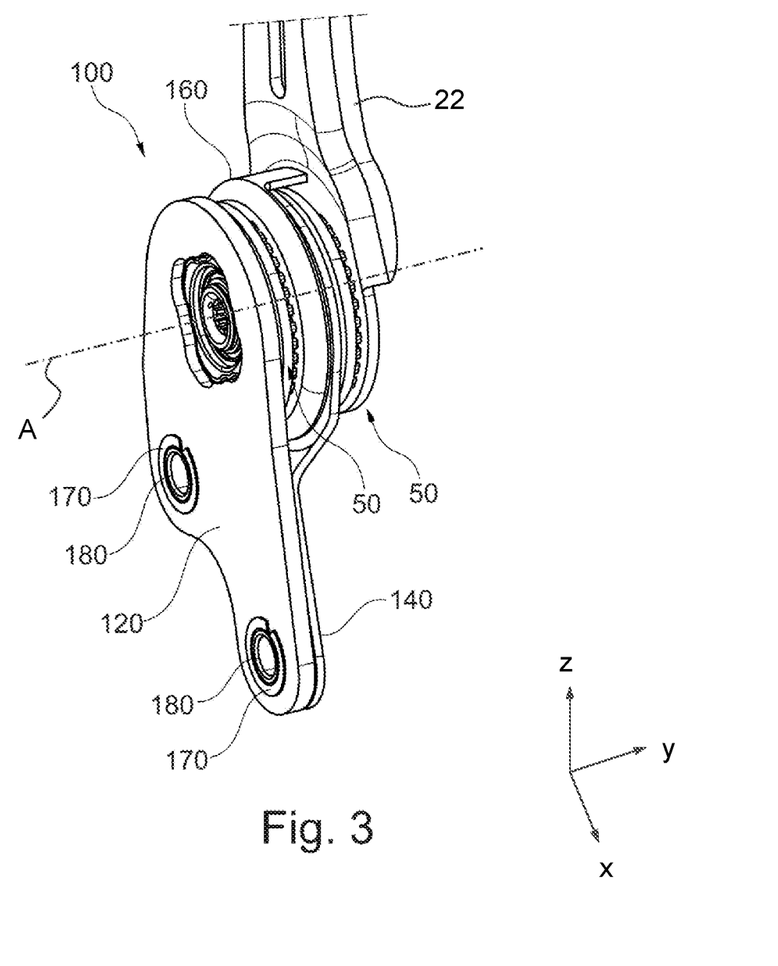
FIG. 3 shows a further perspective view of the double fitting according to the invention and further components of the vehicle seat according to the invention from FIG. 1.
Figure 4:
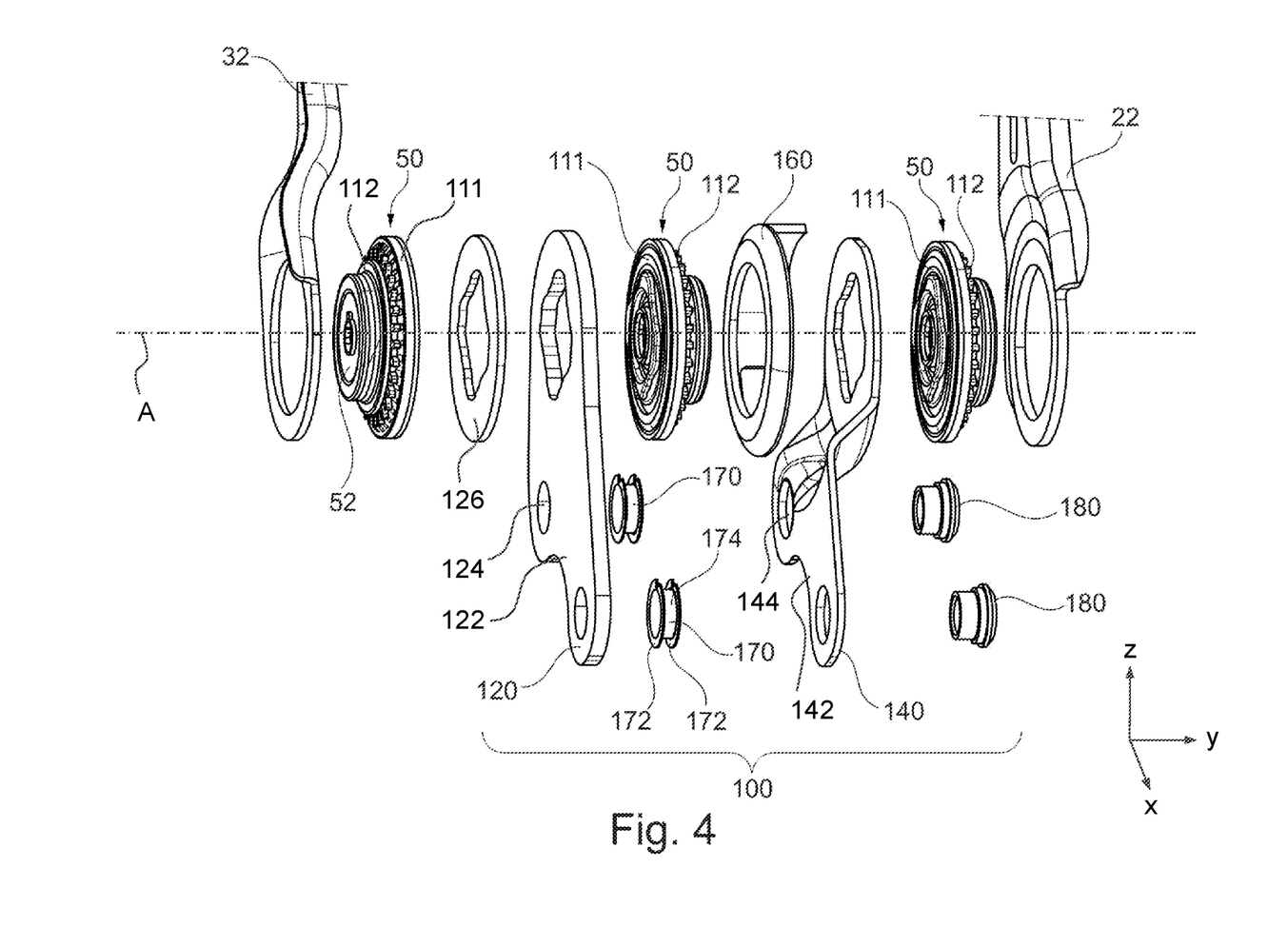
FIG. 4 shows an exploded illustration of the double fitting according to the invention and of further components of the vehicle seat according to the invention from FIG. 1.

The inclination of the first backrest 20 is adjustable about the axis A by means of the double fitting 100 and the single fitting 50. The two fittings 50 of the double fitting 100 and the single fitting 50 are operatively connected to one another by means of a transmission rod 60. In the case of geared fittings in the form of a tumble fitting, the axis A tumbles slightly with an eccentricity relative to the vehicle coordinate system. Owing to the tumbling axis A, the first fitting part 111 tumbles relative to the second fitting part 112 in the case of a tumble fitting. A rotational movement of the two fitting parts 111, 112 relative to one another is thus a tumbling movement with a defined eccentricity superposed thereon. The eccentricity preferably amounts to less than 10 millimeters.

Each of the two fittings 50 of the double fitting 100 has a driver 52 for driving the adjustment movement between the in each case first fitting part 111 and the second fitting part 112. The drivers 52 each have an internal toothing 54. The transmission rod 60 has an external toothing that corresponds to the internal toothing 54 of the drivers 52 such that the transmission rod 60 that has been pushed into the drivers 52 connects the two drivers 52 rotationally conjointly to one another. Furthermore, a driver 52 of the fitting 50 arranged on the opposite side of the first backrest 20 is connected rotationally conjointly to the transmission rod 60 in the same way. Correspondingly, the transmission rod 60 is pushed into an internal toothing of an output of a geared motor 70, such that an actuation of the geared motor 70 causes a rotational movement of the transmission rod 60, whereby the drivers 52 of the fittings 50 of the double fitting 100 and of the single fitting 50 are driven, and the inclination of the first backrest 20 is changed.

Aside from the two fittings 50, the double fitting 100 comprises a first adapter part 120, a second adapter part 140 and an adapter 160. The second adapter part 140 is fixedly connectable to the structure part 80 of the vehicle seat 1, in particular by screw connection by means of two screws 190. The first adapter part 120 is connected, so as to be rotatable about the axis A to a limited extent in the manner described below, to the second adapter part 140.

The first adapter part 120 is connected, in particular welded, to the first fitting part 111 of a first of the two fittings 50 of the double fitting 100. The second adapter part 140 is connected, in particular welded, to the first fitting part 111 of a second of the two fittings 50 of the double fitting 100.

The adapter 160 is fixedly connected to the second fitting part 112 of the first of the two fittings 50 of the double fitting 100. For this purpose, the adapter 160 has a disk-like region which is connected, preferably welded, to the second fitting part 112 of the first of the two fittings 50 of the double fitting 100. The adapter 160 is furthermore fixedly connectable to a structure component 22 of the first backrest 20. For this purpose, the adapter 160 has a ring-segment-shaped region that engages over the second adapter part 140 and the second of the two fittings 50 of the double fitting 100 in the transverse direction y and is fixedly connected, in particular welded, to a structure component 22 of the first backrest 20. Furthermore, the second fitting part 112 of the second of the two fittings 50 of the double fitting 100 is connectable, in particular welded, to the first backrest 20.

The first adapter part 120 has a fastening section 122. The fastening section 122 points in a radial direction away from the axis A in the manner of a flange. The second adapter part 140 has a fastening section 142. The fastening section 142 points in a radial direction away from the axis A in the manner of a flange. The fastening section 142 is cranked in the transverse direction y such that, on the one hand, the first of the two fittings 50 of the double fitting 100 and the adapter 160 are arranged between the two adapter parts 120, 140, and on the other hand, the two fastening sections 122, 142 lie areally against one another in a region radially outside the fittings 50.

The fastening section 122 of the first adapter part 120 has two passage holes 124. The fastening section 142 of the second adapter part 140 has two passage holes 144. The passage holes 124 of the first adapter part 120 are aligned with the passage holes 144 of the second adapter part 140.

Figure 5:
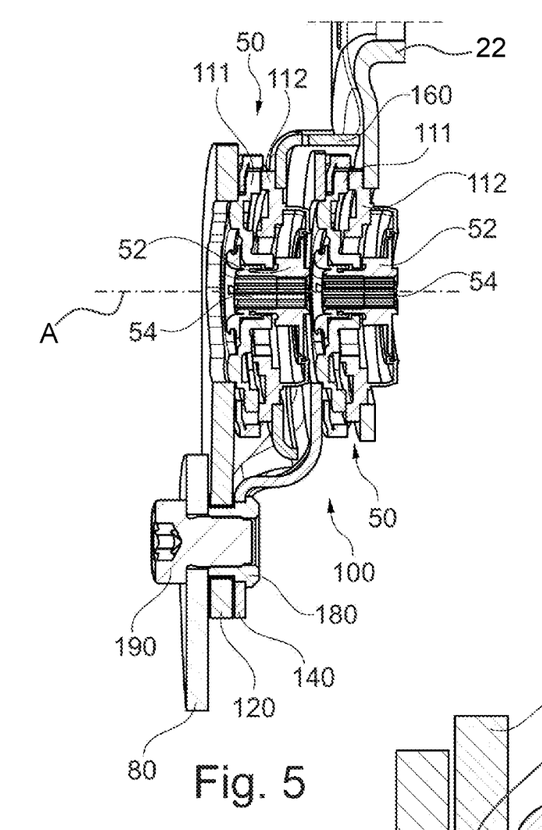
FIG. 5 shows a section through the double fitting according to the invention in the region of an elastic element of the double fitting and through a structure part of a first seat part.
Figure 6:
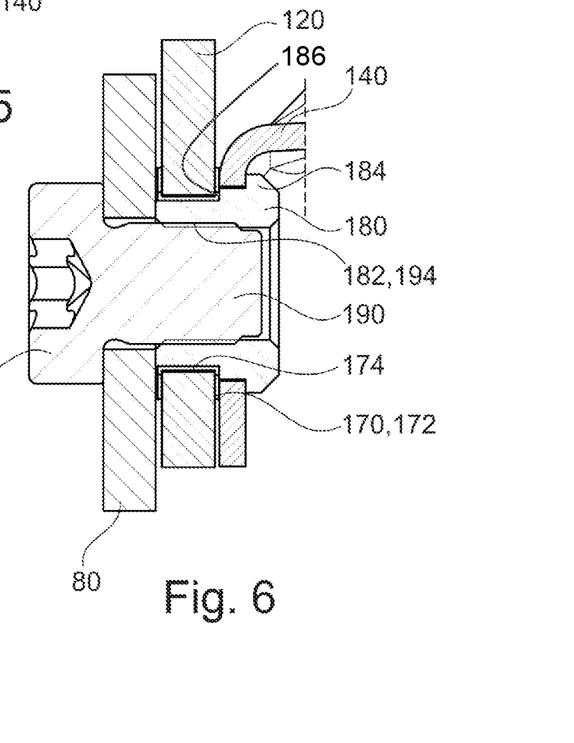
FIG. 6 shows a detail view from FIG. 5.

In each case one elastic element designed as a bearing bushing 170 is inserted into each of the two passage holes 124 of the first adapter part 120. The bearing bushings 170 each have a U-shaped cross section with a web 174 and two flanges 172. The web 174 serves for imparting a bearing action in a radial direction. The two flanges 172 serve for imparting a bearing action in and counter to the axial direction (transverse direction y).

In each case one bushing designed as a threaded bushing 180 is inserted into each of the two passage holes 144 of the second adapter part 140, and preferably welded to the second adapter part 140. In a modification of the exemplary embodiment, the threaded bushing is integrated into the second adapter part, for example is formed out of said second adapter part by drawing.

The threaded bushings 180 each have an internal thread 182 and a shoulder 184. The threaded bushings 180 are each inserted into the second adapter part 140 in the direction of the first adapter part 120. Here, the shoulder 184 bears against a side of the second adapter part 140 which faces away from the first adapter part 120.

For the screw connection of the double fitting 100 to the structure part 80, in each case one screw 190 is passed through a passage opening in the structure part 80, and an external thread 194 of the screw 190 is screwed into the internal thread 182 of the threaded bushing 180. Here, the structure part 80 is clamped between a screw head 192 of the screw 190 and the threaded bushing 180, such that the second adapter part 140 and the structure part 80 are fixedly connected to one another.

The threaded bushings 180 each bear a bearing bushing 170 on their outer circumference. The adapter parts 120, 140 are thus connected to one another rotationally conjointly about the axis A with the interposition of the bearing bushings 170 as elastic elements. The adapter parts 120, 140 are rotatable relative to one another to a limited extent about the axis, if appropriate after an idle travel resulting from a play between the threaded bushings 180 and the bearing bushings 170 and/or a play between the bearing bushings 170 and the first adapter part 120 has been passed through. A rotation of the adapter parts 120, 140 relative to one another preferably causes an elastic deformation of the bearing bushings 170.

One of the two flanges 172 of the bearing bushing 170 is arranged between a step 186 of the threaded bushing 180 and the first adapter part 120. The other of the two flanges 172 of the bearing bushing 170 is arranged between the first adapter part 120 and the structure part 80. In this way, the first adapter part 120 is also mounted elastically with respect to the second adapter part 140 and the structure part 80 in the transverse direction y.

That fitting 50 of the second backrest 30 which faces toward the first backrest 20 is arranged on a side of the first adapter part 120 which faces away from the double fitting 100. A first fitting part 111 of the fitting 50 of the second backrest 30 is connected, preferably welded, to the first adapter part 120 with the interposition of a spacer disk 126. A second fitting part 112 of said fitting 50 is connected, preferably welded, to a structure component 32 of the second backrest 30. The spacer disk 126 can be omitted.

The spacer disk 126 and the fitting 50, fastened thereto, of the second backrest 30 are not imperatively required parts of the double fitting 100 according to the invention.

The features disclosed in the above description, in the claims and in the drawings may be of importance both individually and in combination for the implementation of the invention in its various embodiments.

LIST OF REFERENCE DESIGNATIONS

1 Vehicle seat
11 First seating position
12 Second seating position
13 Third seating position
20 First backrest
22 Structure component
30 Second backrest
32 Structure component
40 Third backrest
50 Fitting
52 Driver
54 Internal toothing
60 Transmission rod
70 Geared motor
80 Structure part (of a seat part)
100 Double fitting
111 First fitting part
112 Second fitting part
120 First adapter part
122 Fastening section
124 Passage hole
126 Spacer disk
140 Second adapter part
142 Fastening section
144 Passage hole
160 Adapter
170 Elastic element, bearing bushing
172 Flange
174 Web
180 Threaded bushing
182 Internal thread
184 Shoulder
190 Screw 192 Screw head
194 External thread
A Axis
x Longitudinal direction
y Transverse direction
z Vertical direction

The invention claimed is:

1. A double fitting for a motor vehicle seat, the double fitting, comprising:
two fittings which are operatively connected to one another, wherein each of the two fittings comprises a first fitting part and a second fitting part, wherein the first fitting part and the second fitting part of each of the two fittings are in each case in geared connection with one another or are lockable together and are rotatable relative to one another about an axis, and
two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat or is fixedly connectable to a vehicle body part, and the other of the two adapter parts is connected, so as to be movable to a limited extent, in particular rotatable about the axis to a limited extent, to the adapter part which is fixedly connectable to the structure part of the vehicle seat or to the adapter part which is fixedly connectable to the vehicle body part, wherein at least one elastic element is arranged between the adapter parts,
wherein a first of the two fittings of the double fitting is arranged axially between the two adapter parts, and one of the two adapter parts is arranged axially between the two fittings of the double fitting,
wherein the at least one elastic element is a bearing bushing.

2. The double fitting as claimed in claim 1, wherein the elastic element has a material with a flexibility greater than the flexibility of the materials of the adapter parts in a region of the adapter parts against which the at least one elastic element bears.

3. The double fitting as claimed in claim 1, wherein the at least one elastic element has an elastic material, selected from a plastic or a rubber material, or wherein the at least one elastic element is manufactured from an elastic material, selected from a plastic or a rubber material.

4. The double fitting as claimed in claim 1, wherein the at least one elastic element is arranged in a radial direction and/or in an axial direction between the adapter parts.

5. The double fitting as claimed in claim 1, wherein the second adapter part has at least one threaded bushing, which bears on the at least one elastic element, and via the at least one elastic element the first adapter part, in a radial direction.

6. The double fitting as claimed in claim 1, wherein the second adapter part is arranged axially between the two fittings of the double fitting.

7. The double fitting as claimed in claim 1, wherein the first adapter part is fastened to the first fitting part and an adapter is fastened to the second fitting part of the fitting arranged between the two adapter parts of the double fitting.

8. The double fitting as claimed in claim 7, wherein the adapter engages axially over the other fitting of the double fitting.

9. The double fitting as claimed in claim 8, wherein the first adapter part is fastened to the first fitting part of the other fitting.

10. A vehicle seat having a backrest and having a seat part, wherein the backrest is connectable by the double fitting as claimed in claim 1 to a structure part of the seat part or to a vehicle body part.

11. The vehicle seat as claimed in claim 10, wherein a further backrest of the vehicle seat is, via a further fitting, connected to the structure part of the vehicle seat or connectable to the vehicle body part.

12. The vehicle seat as claimed in claim 11, wherein one fitting part of the further fitting is fixedly connected, if appropriate with the interposition of a spacer disk, to the first adapter part.

13. The vehicle seat as claimed in claim 12, wherein one fitting part of the further fitting is fixedly connected, if appropriate with the interposition of a spacer disk, to one of the adapter parts.

14. A double fitting for a motor vehicle seat, the double fitting, comprising:
two fittings which are operatively connected to one another, wherein each of the two fittings comprises a first fitting part and a second fitting part, wherein the first fitting part and the second fitting part of each of the two fittings are in each case in geared connection with one another or are lockable together and are rotatable relative to one another about an axis, and
two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat or is fixedly connectable to a vehicle body part, and the other of the two adapter parts is connected, so as to be movable to a limited extent, in particular rotatable about the axis to a limited extent, to the adapter part which is fixedly connectable to the structure part of the vehicle seat or to the adapter part which is fixedly connectable to the vehicle body part, wherein at least one elastic element is arranged between the adapter parts,
wherein a first of the two fittings of the double fitting is arranged axially between the two adapter parts, and one of the two adapter parts is arranged axially between the two fittings of the double fitting,
wherein the at least one elastic element is arranged in a radial direction and/or in an axial direction between the adapter parts.

15. A double fitting for a motor vehicle seat, the double fitting, comprising:
two fittings which are operatively connected to one another, wherein each of the two fittings comprises a first fitting part and a second fitting part, wherein the first fitting part and the second fitting part of each of the two fittings are in each case in geared connection with one another or are lockable together and are rotatable relative to one another about an axis, and
two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat or is fixedly connectable to a vehicle body part, and the other of the two adapter parts is connected, so as to be movable to a limited extent, in particular rotatable about the axis to a limited extent, to the adapter part which is fixedly connectable to the structure part of the vehicle seat or to the adapter part which is fixedly connectable to the vehicle body part, wherein at least one elastic element is arranged between the adapter parts, wherein a first of the two fittings of the double fitting is arranged axially between the two adapter parts, and one of the two adapter parts is arranged axially between the two fittings of the double fitting, wherein the second adapter part is arranged axially between the two fittings of the double fitting.

* * * * *